Feb. 10, 1942. E. VON VEH 2,272,650
FLUID SEAL FOR DIRECT INSERTION BETWEEN RELATIVELY MOVING MACHINE PARTS
Filed July 28, 1936
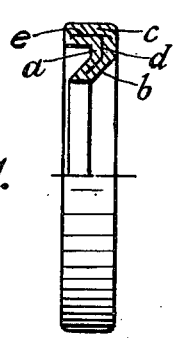
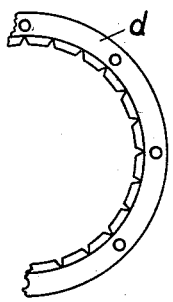
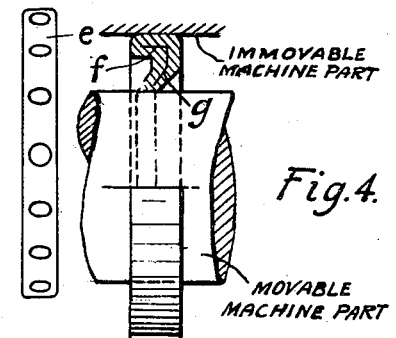
Fig.1. Fig.2 Fig.3 Fig.4
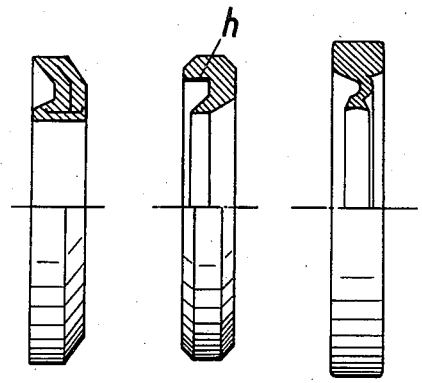
Fig.5  Fig.6  Fig.7  Fig.8  Fig.9
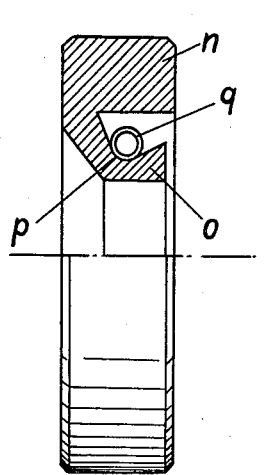
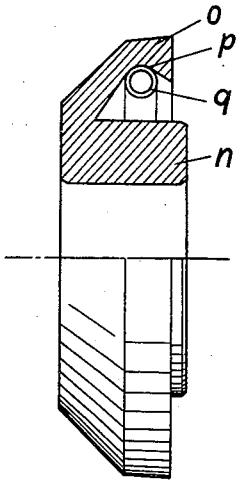
Fig.10  Fig.11
Inventor
E. von Veh
By C. F. Wenderoth, Atty Patented Feb. 10, 1942

2,272,650

UNITED STATES PATENT OFFICE 2,272,650

FLUID SEAL FOR DIRECT INSERTION BETWEEN RELATIVELY MOVING MACHINE PARTS

Ernst von Veh, Weinheim, Baden, Germany, assignor to Carl Freudenberg G. m. b. H., Weinheim, Baden, Germany, a German society Application July 28, 1936, Serial No. 93,106
In Germany February 21, 1936

1 Claim. (Cl. 288—2)

The invention relates to oil seals of the most varied kinds for moving machine parts intended for making joints against liquids, gases or dust, and distinguished by the simplicity of their manufacture and their application, by their length of life, and by the extent of their field of application.

Oil seal sleeves and turned-over oil seals in the form of caps, cups and grooved rings having equal or unequal limbs and so forth which are made of a material, for example rubber, possessing uniform elasticity over the entire cross-section of these moulded pieces, are known. Similarly, shaped oil seal elements are also known wherein considerable stability of shape, particularly to high pressures of the liquids and gases against which the joints have to be effected, has been attained by means of single or multiple layer insertions of material or wire netting extending through the entire cross-section. Oil seals of the last kind have, however, generally a comparatively great stiffness, which for example in the case of the packing of shafts running in self-aligning bearings or shafts which vibrate in consequence of inaccurate mounting, produces a bad joint and causes detrimental frictional losses and an injurious evolution of heat, due to the considerable forces of deformation. Since in the case of oil seals of the last mentioned kind the bearing surface on the machine part which moves in relation to the oil seal, and which may be called the sliding section, is generally larger than the bearing surface on the fixed part of the machine, which may be called the holding section, the securing of these oil seals necessitates supplementary devices, for example pressure flanges, which hold them fast by pressing in the direction of the axis of the shaft, rod or the like which is to be sealed.

There are also known so-called directly insertable oil seals, in particular oil seal rings ready for insertion which by their own radial stress alone adhere to the machine part carrying them sufficiently to afford a seal against liquid or gas pressures that are not too high, and which consequently do not require a special holding device, such as a pressure flange. They are noted, however, for their complicated and costly construction. Such oil seals have hitherto been made of at least two separate parts namely, a casing, for example a sheet metal cage, and the oil sealing element proper, for example of leather. There is usually employed a multi-part holding cage, in which the oil sealing element is fastened by clamping or sticking, generally in such a manner that it is provided with the necessary hold by means of special auxiliary elements, such as distance pieces, which are firmly connected with the casing by beading or otherwise.

The oil sealing elements of such composite packings are generally made of materials, such as leather, which when suitably prepared are sufficiently tight, flexible, and to a certain extent stable in form. This preparation comprises a special impregnation for closing the existing pores which would be prejudicial to the tightness, particularly in the case of high temperatures or fluctuating pressures. It has been found, however, that the impregnating agent during the working of the material loses its hold on the fibres in consequence of variations of temperature, pressure and humidity, so that the packing elements of leather become pervious after comparatively long use.

On the other hand, packing elements of leather and the like have to be built in a stiff cage for the purpose of producing the necessary stiffness of the packing in its holding section—i. e. the part with which it is secured to the stationary machine part. In this case the several parts that are necessary for securing and holding in position the packing element, such as angular rings, intermediate washers and other pressing elements, work against one another in certain cases.

On the other hand, it is not possible to make one-part packings of leather in such a manner that they have in the holding section a sufficient natural stiffness to maintain the necessary stress in relation to the stationary machine part, and, on the other hand, to have the necessary flexibility in the sliding section—i. e. in the part that bears on the surface to be packed or sealed. In most cases, therefore, it is in addition necessary to increase the degree of elasticity of the sliding section and to ensure a tight application of the sliding section by means of spring elements, such as helical spring rings.

The oil seals according to the invention possess the advantages of all the known oil seals without their disadvantages. They consist of a material which is plastically deformable in the preparatory condition but which is solid and elastic to a determinable degree in the condition of use and are characterised essentially by the feature that they form a one-part body with a stiff holding section which is capable of holding the packing body fast by its own stress in the relatively stationary machine part, and an elastically flexible sliding section which bears with a slight stress, so as to form a seal, on the relatively moving machine part.

As materials for making the oil seals according to the invention there come into consideration natural or artificial products of polymerisation of organic unsaturated compounds, in particular unsaturated hydrocarbons. It is possible to employ with advantage natural or synthetic rubbers, and also polyvinyl or polyacryl compounds, which are obtained in a plastically deformable condition by condensation and polymerisation of the corresponding monomeric compounds and also of their solutions or aqueous emulsions, and by supplementary treatments may be brought into a form varying from an extensively flexible form to a stiff form. It is possible to select from among these materials, in accordance with the purpose of the sealing elements to be produced, those which are resistant to mineral oils, benzine, glycerine, gases, dust, acids, alkalis, lyes and waste liquors of all kinds, etc.

The polymerization products may be used both as such and with the addition of filling and leading materials, particularly those which increase their strength or tightness or improve other properties. As filling materials of a fibrous nature it is possible to employ natural and artificial animal, vegetable or mineral fibres, such as leather fibres, skin fibres, wool, silk, artificial silk or asbestos fibres. In some cases the polymerization products will be swelled in solvents and when swelled mixed with the fibrous materials. As non-fibrous additional materials, it is possible to employ metal powder, for example aluminium powder, metal chips, for example iron filings, metal oxides, for example iron oxide, zinc oxide, mineral substances such as siliceous chalk, kieselguhr, kaolin, also graphite, lampblack and the like. When metal powders and metal chips are used, moulded bodies of high thermal conductivity are obtained.

Also, the polymerization products may be mixed with softening agents, vulcanization agents and vulcanization accelerators.

The production of the packing elements from these materials may be effected in different ways. The raw materials may be cast, wet-moulded, dried and then vulcanized. They may be pressed in powder form or in tablet form after the manner of the production of articles from the condensation products of resins. They may be extruded through nozzles and the rods so obtained may be cut up into lengths and fused to form annular articles. A further possible method is to make them by the processes usually employed in the case of leather sleeves, the packing material being stamped in the form of discs out of plates, shaped and if required then brought to the required dimensions by stamping, trimming or turning.

There are various ways of producing one-piece oil seals which according to the invention have a stiff holding section and a flexibly elastic sliding section.

The two sealing sections may be made of different materials or of differently treated materials and then united to form a continuous whole. Thus, for example, the two sections may be formed separately and the holding section may be provided with hardening filling materials to a greater degree, whereupon the two sections are united by fusing or welding them together, or in some other way. On the other hand greater quantities of vulcanization agents may be incorporated in the separately formed holding section, so that this section has a higher degree of stiffness after uniting with the sliding section and vulcanisation in common.

The adjustment of the two sections of the sealing body made of the same material to different degrees of stiffness or flexibility may be effected by giving the two sections different cross-sections, for example in such a manner that the holding section is made massive whilst the sliding section is made in the form of a narrow lip.

It is, of course, also possible to combine these different constructional forms, for example in such a manner that the properties of the two sections are affected both by the choice of the material or its preliminary treatment and also by the choice of the cross-sections.

The shaped structures obtained are characterised inter alia by a good packing effect of the elastically flexible sliding sections, by the firmness of hold of the stiff holding section, by the stability of its shape and by a specially good running property. The friction between the sliding section of the packing and the moving packed parts is very small, so that the packings wear away only very slowly. Moreover, there is a better utilization of the power in devices packed according to the invention.

For special purposes the stiffness or the mechanical resistance of the holding section of the sealings against high pressure, may be increased by the insertion or super-position of moulded pieces of stiff materials, for example rings, angle-plates, tongue rings, metallic members for giving rigidity and strength of sheet metal and the like materials. These stiffening bodies may be firmly connected to the packing to form a single unit, for example by vulcanising. Preferably these vulcanized reinforcing inserts are arranged at the points liable to excess pressure of the medium being sealed. Advantageously, the inserted bodies are provided with perforations that allow the packing material to pass through so that the inserted bodies are firmly anchored in the packing material. This prevents the continuous packing body from separating into disconnected layers. In some cases the intimate adhesion can be increased by roughening the insertions.

Some constructional forms of packings according to the invention are represented in the accompanying drawing, wherein:

Figure 1 shows in side view, half in section, a packing with a metallic member for stiffening the holding part and an insertion in the form of an angle-section ring;

Figure 2 shows an angle-section ring with a flange cut up into spring tongues;

Figure 3 shows the perforated metallic member for giving rigidity and strength;

Figure 4 shows a unit insertion piece for stiffening the holding section and having a spring web;

Fig. 5 shows an external seal of construction similar to that of Fig. 1;

Fig. 6 shows a seal with a vulcanized reinforcing ring on a part of the half section;

Figs. 7 and 8 show members without inserts, wherein the rigidity and elasticity are relatively adjusted by the dimensions of the profile of the half section and sliding section;

Fig. 9 is intended to show how unitary members of the desired type can be obtained in finished state from individual rings for the half section and sliding section produced from different masses and substances;

Figs. 10 and 11 show an internal seal or external seal wherein the sliding section is provided with an annular recess for the reception of a spiral spring ring.

Separately, a is the packing body having the sliding section b and the holding section c. d is an angle-section ring as shown in Figure 2 and e a metallic member for giving rigidity and strength according to Figure 3. The angle-section ring and the metallic member for giving rigidity and strength form in Figure 4 a unit piece f. In this way the holding section is stiffened to a considerable extent; the elasticity, which is already produced per se by the profiling of the sliding section, is further increased by the elastic spring tongues of the web g.

The ring h of Fig. 6 serves the same purpose. The sliding section i of the ring, pre-formed to a narrow lip, according to Fig. 8, is adjusted to the necessary degree of flexibility relative to the half section k, which is rigid to the extent necessary, exclusively by reason of its form, as easily determined by preliminary test. The embodiment of Fig. 9 is produced, for example, by forming a shaped strand l to a ring and then vulcanizing it together with a strand section expressed through nozzles and combined into a ring. The outer ring, however, can be produced also by stamping or the like. By reason of its mass properties it has greater rigidity after vulcanisation.

This constructional form presents the advantage that, with a given nozzle cross-section for the production of the rod of the sliding section, the same shafts can be packed with packing elements of different external dimensions or, conversely, packings for different shaft dimensions can be inserted into machine bores of the same diameter, because the stamped-out holding section can be made thicker or thinner in accordance with the particular requirements.

The constructional examples illustrated exhibit forms that are determined substantially by the difference of the elasticity of the material in the final condition, for instance the packing body according to Figures 1 to 7 may consist uniformly of a comparatively soft material that according to Figure 8 of a moderately stiff material and that according to Figure 9 of materials of different elasticity.

Fig. 10 shows an inner seal which, by reason of the shaping, has a reinforced half section n and a sliding section o which is provided with a recess p running all around for the reception of a spring ring 9.

Fig. 11 shows a corresponding outer seal.

I claim:

As an article of manufacture, a fluid seal adapted for insertion under peripheral tension to establish a self-sustaining leak-tight anchorage against a shaft which projects through a circular opening comprising a rigid continuous circular ring, said ring having an axial portion extending parallel to said shaft but spaced therefrom and a radial portion adjacent said axial portion and extending outward, a body portion of pliant moldable material molded around said ring, said material which lies between the periphery of said shaft and the inner periphery of said body portion being of substantially equal thickness whereby the peripheral compression thereof will support said ring substantially concentric with said shaft, and a depending pliant lip portion formed integral with and joined to said body portion near the outer periphery of the radial portion of said ring, said lip portion extending into sealing contact with said opening.

ERNST VON VEH.